Patented May 24, 1938

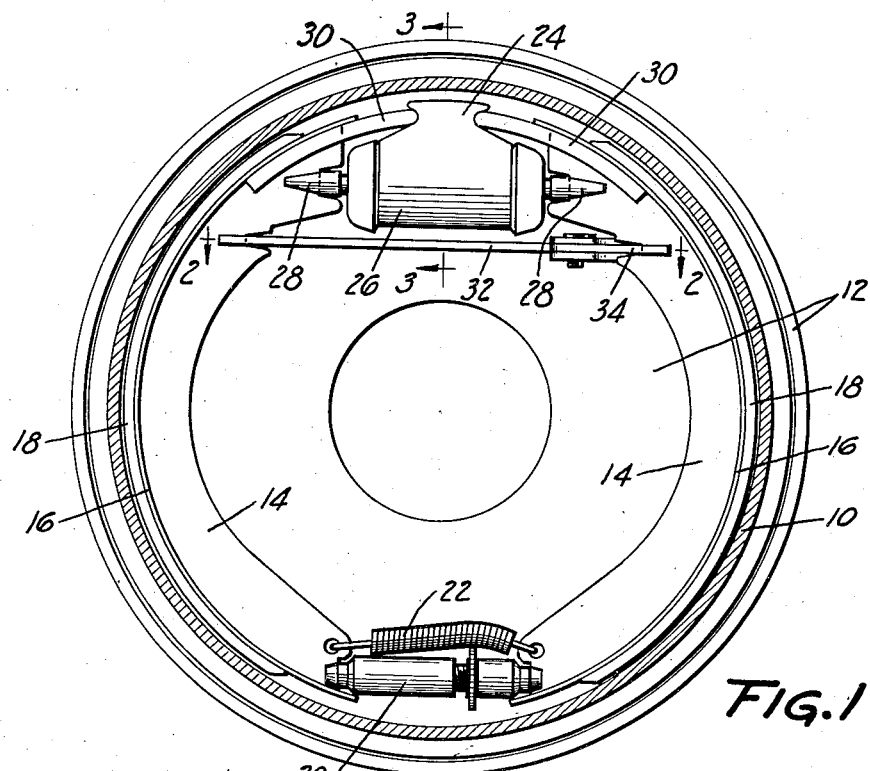
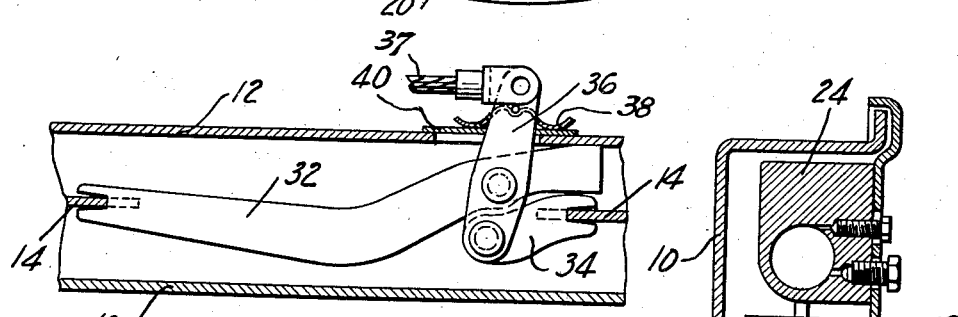
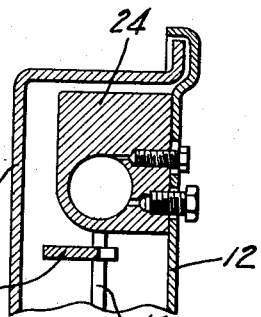
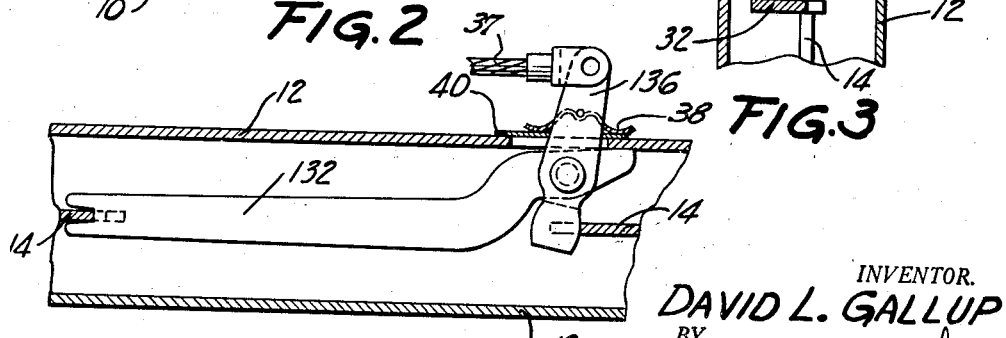

2,118,188

UNITED STATES PATENT OFFICE 2,118,188

BRAKE

David L. Gallup, South Bend, Ind., assignor to Bendix Products Corporation, South Bend, Ind., a corporation of Indiana Application March 30, 1936, Serial No. 71,594

12 Claims. (Cl. 188—152)

This invention relates to brakes, and is illustrated as embodied in an internal expanding brake for an automobile wheel.

An object of the invention is to provide a compact and rugged structure in which the servo or self-applying action of the shoes is minimized by a novel arrangement permitting anchorage immediately adjacent the brake drum instead of some distance radially inward from the drum. As one effective means of doing this, I form the connected shoes of the brake with rims which project beyond or overhang the ends of the stiffening webs of the shoes, and provide means stationarily mounted on the brake backing plate and directly engaged by the ends of the shoe rims and taking the braking torque in the manner of a brake anchor. I prefer to reinforce the overhanging ends of the rims, for example by welding plates to their lower faces.

The above-described anchoring means preferably forms part of an applying device carried by the backing plate between the shoe ends, and shown as acting on the ends of the webs of the shoes. The applying device illustrated is of the hydraulic type, the cylinder being mounted on the backing plate and provided with a part engaged by the shoe rims and serving as the brake anchor. The pistons arranged in the cylinder, or their equivalents, may have thrust parts embracing or otherwise engaging the ends of the shoe webs.

When the novel brake herein described is used on the rear wheels, I prefer to provide auxiliary mechanical applying means for actuation by the emergency brake lever. Preferably this is in the form of a linkage just inside the cylinder, engaging the shoe webs adjacent the ends of the cylinder. The linkage is arranged for actuation by means outside the brake; for example it may have a lever fulcrumed on and extending through the backing plate of the brake.

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the shoes in side elevation;

Figures 2 and 3 are partial sections respectively on the lines 2—2 and 3—3 of Figure 1; and Figure 4 is a partial construction corresponding to Figure 2, but showing a modified construction.

The illustrated brake comprises a rotatable drum 10, at the open side of which is arranged a support such as a backing plate 12, and within which is arranged the brake friction means. This is shown as including two approximately semi-circular shoes, each of which may be formed of a flat stiffening web 14 welded to the inner face of a rim 16 faced with the usual lining 18.

The shoes are preferably connected at the bottom of the brake by an adjustment 20 against which the shoes are held by a tensioned spring 22. The shoes are also provided with the usual return springs, steady rests, etc., which are not specifically shown herein.

At the upper end of the brake, the rims 16 overhang and project beyond the ends of the webs 14, and seat in anchoring engagement in corresponding notches in a part or anchor 24 embraced between them. The part 24 is shown as an integral extension of a cylinder 26 secured stationarily to the backing plate 12, and containing suitable pistons or the like acting through thrust members 28 slotted to embrace the ends of the shoe webs 14.

It will be seen that this novel arrangement brings the anchorage as close to the drum, i. e. radially outward as far, as is physically possible, thereby minimizing the servo or self-applying action of the brake and making its action more constant.

I prefer to reinforce the anchoring ends of the rims 16 by means such as relatively heavy plates 30, slotted to fit over the ends of the webs 14, and fitting against and spot-welded to the inner faces of the rims 16 at their anchoring ends.

Where the above-described brake is used on the rear wheels, it is often desirable to supply a mechanically-operable linkage or other device which can be connected to the emergency lever of the car. In the arrangement of Figures 1–3, this linkage comprises two links 32 and 34, slotted at their outer ends pivotally to embrace the webs 14, and arranged just inside the cylinder 26, for movement in a horizontal plane.

The links 32 and 34 are pivoted to an operating lever 36 arranged perpendicular to the backing plate and extending through an opening in the backing plate and formed and arranged at its outer end for actuation by a cable or the like forming part of a system of operating connections operated by the emergency lever.

The lever 36 is shown as having mounted thereon a resilient leaf spring 38 holding a stamping 40 also mounted on the lever and yieldingly and slidably held against the backing plate and forming a seal for the opening through which the lever passes. The end of link 32 slidably engages the inner face of the backing plate, and forms a movable fulcrum for the linkage.

The modification of Figure 4 is the same as the one described above, except that the lever 136, corresponding to lever 36, has one end rounded and seated in a slot in one of the webs 14, for direct thrust engagement with the corresponding shoe, the connection to the other shoe being through a link 132 slidably engaging the backing plate at one end and slotted to embrace the other web 14 at the other end.

The webs 14 may be notched to embrace the ends of the links 32, 34 and 132, to hold them in place.

While illustrative constructions have been described in detail, it is not my intention to limit the scope of the invention to those particular constructions, or otherwise than by the terms of the appended claims.

I claim:

1. A brake comprising a backing plate having mounted thereon a pair of connected shoes formed with rims and with stiffening webs terminating short of the ends of the rims at the unconnected ends of the shoes, and means stationarily mounted on the backing plate between said unconnected ends and engaged by the ends of said rims and taking the anchoring torque directly from one or the other of said rims, said means positioning the anchored rim or rims radially.

2. A brake comprising a backing plate having mounted thereon a pair of connected shoes formed with rims and with stiffening webs terminating short of the ends of the rims at the unconnected ends of the shoes, said rims being provided with strengthening means at said unconnected ends, and means stationarily mounted on the backing plate between said unconnected ends and engaged by the ends of said rims and taking the anchoring torque directly from one or the other of said rims, said means positioning the anchored rim or rims radially.

3. A brake comprising a backing plate having mounted thereon a pair of connected shoes formed with rims and with stiffening webs terminating short of the ends of the rims at the unconnected ends of the shoes, and an applying device mounted on the backing plate between said unconnected ends and including a part on said applying device stationarily secured to the backing plate and engaged by the ends of said rims and taking the anchoring torque directly from one or the other of said rims.

4. A brake comprising a backing plate having mounted thereon a pair of connected shoes formed with rims and with stiffening webs terminating short of the ends of the rims at the unconnected ends of the shoes, said rims being provided with strengthening means at said unconnected ends, and an applying device mounted on the backing plate between said unconnected ends and including a part on said applying device stationarily secured to the backing plate and engaged by the ends of said rims and taking the anchoring torque directly from one or the other of said rims.

5. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part on said applying device engaged by the ends of said rims and taking the anchoring torque directly from one or the other of said rims.

6. A brake comprising a backing plate having mounted thereon a pair of connected shoes formed with rims and with stiffening webs terminating short of the ends of the rims at the unconnected ends of the shoes, said rims being provided with strengthening means at said unconnected ends, and a hydraulic applying device mounted on the backing plate between said unconnected ends and including a cylinder stationarily secured to the backing plate and provided with a part engaged by the ends of said rims and taking the anchoring torque directly from one or the other of said rims.

7. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part engaged by the ends of said rims and taking the anchoring torque directly from one or the other of said rims, said cylinder containing hydraulically-operated means having parts engaging the ends of the shoe webs.

8. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part engaged by the ends of said rims and taking the anchoring torque directly from one or the other of said rims, said cylinder containing hydraulically-operated means having thrust members slotted to embrace the ends of the shoe webs.

9. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part engaged by the ends of said rims and taking the anchoring torque directly from one or the other of said rims and locating the anchored rim or rims radially, in combination with a mechanical applying linkage arranged on the side of the cylinder toward the center of the brake and operatively engaging the webs of the shoes adjacent opposite ends of the cylinder.

10. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part engaged by the ends of said rims and taking the anchoring torque directly from one or the other of said rims and locating the anchored rim or rims radially, in combination with a mechanical applying linkage arranged on the side of the cylinder toward the center of the brake and operatively engaging the webs of the shoes adjacent opposite ends of the cylinder, said linkage including an operating lever generally perpendicular to the backing plate and extending through the backing plate and operable from outside the backing plate.

11. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part engaged by the ends of said rims and taking the anchoring torque directly from one or the other of said rims, in combination with a mechanical applying linkage arranged on the side of the cylinder toward the center of the brake and operatively engaging the webs of the shoes adjacent opposite ends of the cylinder.

12. A brake comprising a backing plate having mounted thereon a pair of connected shoes formed with rims and with stiffening webs terminating short of the ends of the rims at the unconnected ends of the shoes, and a hydraulic applying device mounted on the backing plate between said unconnected ends and including a cylinder stationarily secured to the backing plate and provided with a part engaged by the ends of said rims and taking the anchoring torque directly from one or the other of said rims, in combination with a mechanical applying linkage arranged on the side of the cylinder toward the center of the brake and operatively engaging the webs of the shoes adjacent opposite ends of the cylinder, said linkage including an operating lever generally perpendicular to the backing plate and extending through the backing plate and operable from outside the backing plate.

DAVID L. GALLUP.